Jan. 26, 1965  J. M. MARZOLF  3,167,723
TUNNEL DIODE STATIC INVERTER
Filed Nov. 25, 1960

INVENTOR
JOSEPH M. MARZOLF

BY *Richard C. Reed*
ATTORNEY

United States Patent Office 3,167,723
Patented Jan. 26, 1965

3,167,723
TUNNEL DIODE STATIC INVERTER
Joseph M. Marzolf, 6420 Garland Drive,
Falls Church, Va.
Filed Nov. 25, 1960, Ser. No. 71,842
4 Claims. (Cl. 331—107)
(Granted under Title 35, U.S. Code (1952), sec. 266)

The invention described herein may be manufactured and used by or for the Government of the United States of America for governmental purposes without the payment of any royalties thereon or therefor.

This invention relates generally to static inverters and more particularly to static inverters for low voltage, high current sources.

Low voltage sources, even though they may be capable of producing high current, have very limited application since modern electric power requirements commonly require voltages in the range of units, tens, or hundreds of volts. Thus adding voltages by series connection of voltage sources in the millivolt range does not provide a practical means for obtaining usable voltage levels. Neither does multiplication of the voltage by the usual static inverter methods provide a practical means of obtaining a usable voltage level since the internal voltage losses of usual static inverters far exceeds the total voltage output of the low voltage sources here under consideration.

Electric energy sources such as thermoelectric generators and solar batteries provide a means of tapping an almost unlimited source of energy for conversion to electric power. Waste heat abounds in gasoline engines, jet engines, and even in electric motors and incandescent lights. However, the usual thermoelectric generator may be expected to produce a voltage of the order of a few millivolts whereas the usual losses in the switching elements of static inverters is ordinarily not less than a half to one volt.

It is accordingly an object of this invention to provide a static inverter having sufficiently small internal losses to be useful with thermoelectric generators and other low voltage sources.

It is another object of this invention to provide a static inverter of extremely simple nature and having extremely small internal losses.

It is another object of this invention to provide a static inverter utilizing both the positive and negative resistance semiconductors to provide an inherent switching action.

Other objects and advantages of this invention will become apparent from consideration of the following description and accompanying drawings.

Briefly, this invention provides a circuit for converting an extremely low voltage direct current source such as a thermoelectric generator to an alternating current source of any desired voltage. This circuit uses Esaki or tunnel diodes to pass current from the source to a step up transformer. These diodes have sufficiently low internal impedance to permit practical operation with such low voltage sources. In addition, the step up transformer also operates to alternately bias the tunnel diodes in a high and low conductance state so that each diode alternately passes an appreciable amount of current. The inversion is thus effected and the frequency of the resultant alternating voltage is determined by circuit parameters.

Figure 1:
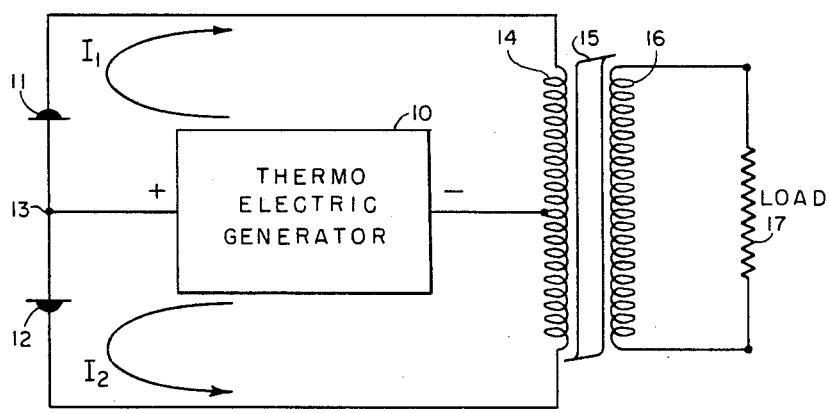
FIG. 1 is a schematic diagram of a representative form of this invention.

Referring now to FIG. 1 in detail, a pair of tunnel diodes 11 and 12 are shown connected back to back at junction 13 and with the remaining terminals connected to opposite ends of a center tapped primary transformer winding 14. Transformer winding 14 is wound upon a magnetic core 15 having square loop hysteresis characteristics. A secondary winding 16 is also wound on core 15 and may be arranged with output terminals for connection to a load 17. Winding 16 has a greater number of turns than either half of winding 14 so that a voltage step up is accomplished. A low voltage, high current source such as a thermoelectric generator 10 is connected between the center tap of transformer winding 14 and the diode junction 13. As shown in FIG. 1 the positive terminal of source 10 is connected to junction 13 to produce current flow in the forward direction through diodes 11 and 12 in the directions shown by arrows labeled $I_1$ and $I_2$, respectively. While the polarities of the source and the polarization of the diodes could all be reversed, an arrangement should be selected that will cause the source to send current in the forward direction through each of the diodes 11 and 12 and a particular polarity is shown in FIG. 1 for the purpose of explanation.

Figure 2:
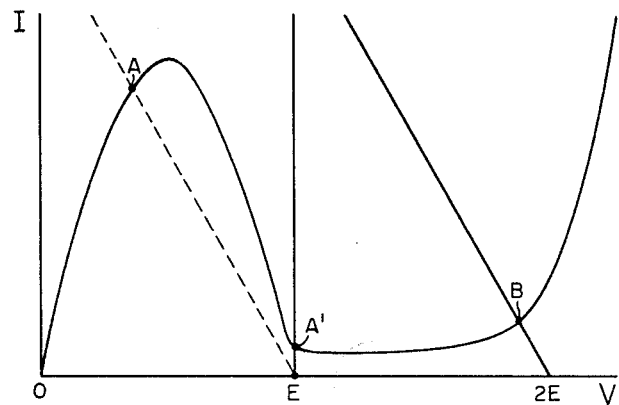
FIG. 2 is a plot of the voltage current characteristic curves of the type of semiconductors shown in FIG. 1.

The operation of the circuit of FIG. 1 will be better understood by referring to the voltage current characteristic curves shown in FIG. 2. In accordance with a preferred embodiment of this invention the impedance of each of the diodes 11 and 12 and primary winding 14 is selected, with respect to that of the power source 10, so that the load line for each of tunnel diodes 11 and 12 will have the slope indicated by the lines AE and B2E in FIG. 1. Then, the voltage of the power source 10 is selected to have a value E with respect to the characteristic curve OAA′B of the tunnel diodes 11 and 12. Thus it will be seen that for a voltage E the current through a tunnel diode will have the value A which will be observed to be near its peak value.

Now referring to the circuit of FIG. 1, it will be observed that when both diodes are conducting current, the resultant currents $I_1$ and $I_2$ flowing through transformer winding 14 would tend to oppose one another, however, in actual practice when power from source 10 is first applied to the circuit, the current in one branch will always exceed the other slightly due to minor differences in the diode characteristics. The current in the path of the diode having the head start will oppose current in the other diode and will itself continue to increase. If, for example, it is assumed that current in diode 11 was increasing faster than current in diode 12, then as current $I_1$ began to flow it would induce a voltage in the lower half of transformer winding 14 which would tend to add to the voltage from source 10 with respect to current flow through diode 12. The increased voltage across diode 12 places this diode in its low or valley current region as the impressed voltage upon it increases above the value E and until it reaches its final voltage 2E. It will be observed from FIG. 2 that when the voltage E is impressed across diode 11 and the voltage 2E impressed across diode 12 that diode 11 will be heavily conducting as represented by point A. Thus there is current flowing much more predominantly in the upper half of winding 14 of the transformer and a substantial voltage may thereby be induced in secondary 16. As the current $I_1$ continues to flow in the upper half of transformer winding 14, core 15, being of square loop characteristic, begins to approacch saturation. When the core saturates winding 14 becomes a very low impedance. The circuit now operates with a low impedance load line which is substantially vertical as indicated by the line EA′, in FIG. 2. Thus the operating point shifts from A to A′. Since the current is now very low, the voltage induced in the lower half of winding 14 collapses and the operating point of diode 12 shifts from B to A. Thus the current $I_2$, now having the value A, induces a voltage in the upper half of winding 14 which changes the operating point of diode 11 from A′ to B. It will be seen that a new half cycle of output voltage will appear in winding 16 each time the core 15 goes to saturation.

A specific example of this invention used germanium tunnel diodes producing a current peak with an applied voltage of about 55 millivolts. A thermoelectric generator consisting of 16 p.n. junctions provided a sufficient value of E to provide the switching action just described and for the particular core and number of turns used provided an increased voltage at about 29 cycles per second. Variations in the size of the thermoelectric generator or other low voltage source, in the size and material of the core, in the number of turns and the turns ratio, and in the tunnel diode material may all be varied to obtain variations in the voltage, current and frequency of the output without departing from the invention as described above, and defined in the appended claims.

What is claimed is:

1. A static inverter comprising a saturable core with square loop hysteresis characteristics having secondary and center tapped primary windings, a pair of tunnel diodes connected back to back and to opposite terminals of said primary winding, a direct current source connected between the common terminal of said diodes and the center tap of said primary and polarized to send forward current through both diodes in opposite direction through said primary, said source having a voltage level exceeding that corresponding to the current peak of each of the diodes.

2. A static inverter comprising a saturable core with square loop hysteresis characteristics having secondary and center tapped primary windings, a pair of tunnel diodes connecting back to back and to opposite terminals of said primary winding, a direct current source connected between the common terminal of said diodes and the center tap of said primary and polarized to send forward current through both diodes in opposite direction through said primary, said source having a voltage level falling within the negative conductance region of said diodes.

3. A static inverter comprising a saturable core with square loop hysteresis characteristics having secondary and center tapped primary windings, a pair of tunnel diodes connected back to back and to opposite terminals of said primary winding, a direct current source connected between the common terminal of said diodes and the center tap of said primary and polarized to send forward current through both diodes in opposite direction through said primary, said voltage source having a value which, when multiplied by both one and two, falls substantially within the valley conductance region of the diodes.

4. A static inverter comprising a saturable core with square loop hysteresis characteristics having secondary and center tapped primary windings, a pair of tunnel diodes connected back to back and to opposite terminals of said primary winding, a direct current source connected between the common terminal of said diodes and the center tap of said primary and polarized to send forward current through both diodes in opposite direction through said primary, said source having a voltage level not less than that of the negative conductance region of said diodes, the impedance of said primary winding being selected with respect to the impedance of the source to produce a current load line for the diodes of negative slope when the transformer is in an unsaturated state.

References Cited by the Examiner
UNITED STATES PATENTS

| | | | |
|---|---|---|---|
| 2,581,273 | 1/52 | Miller | 307—88.5 |
| 2,777,956 | 1/57 | Kretzmer | 331—113 X |
| 3,005,860 | 10/61 | Bruck | 331—107 |
| 3,127,574 | 3/64 | Sommers | 331—107 |

OTHER REFERENCES

Article by Hines in Bell System Tech. Journal, May 1960, pages 479, 491–493.

Light Powered Oscillator, by Miller; IBM Technical Disclosure Bulletin; vol. 3, No. 4, Sept. 1960.

Tunnel Diodes as Amplifiers and Switches, by Sylvan and Sottlieb; reprinted from May 1960, issue of Electronic Equipment Engineering, 7 pages.

ROY LAKE, *Primary Examiner.*

SAMUEL BERNSTEIN, JOHN KOMINSKI,
*Examiners.*